Patented July 27, 1954

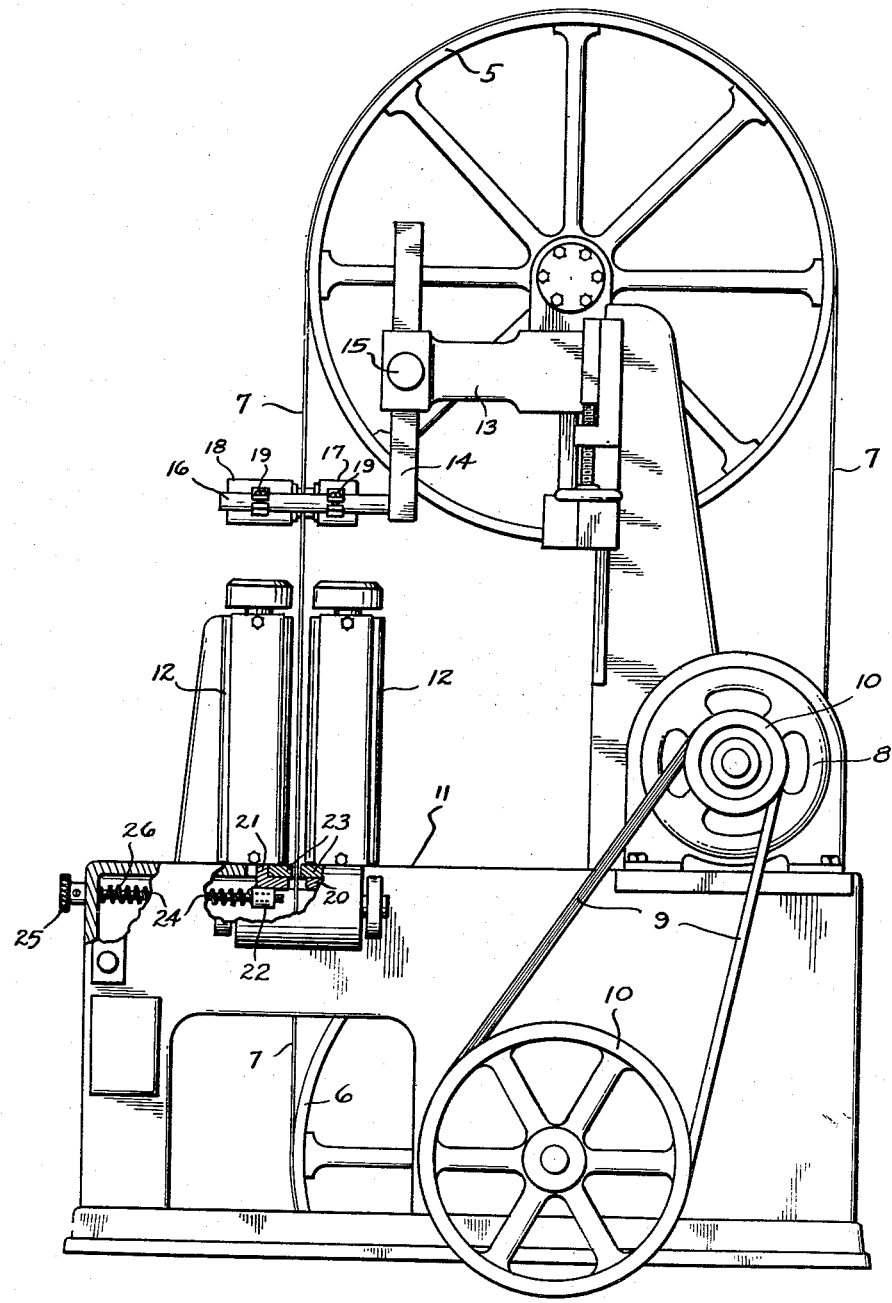
Fig. 1.
INVENTOR.
Ernest R. Ferrari
BY
Atty.

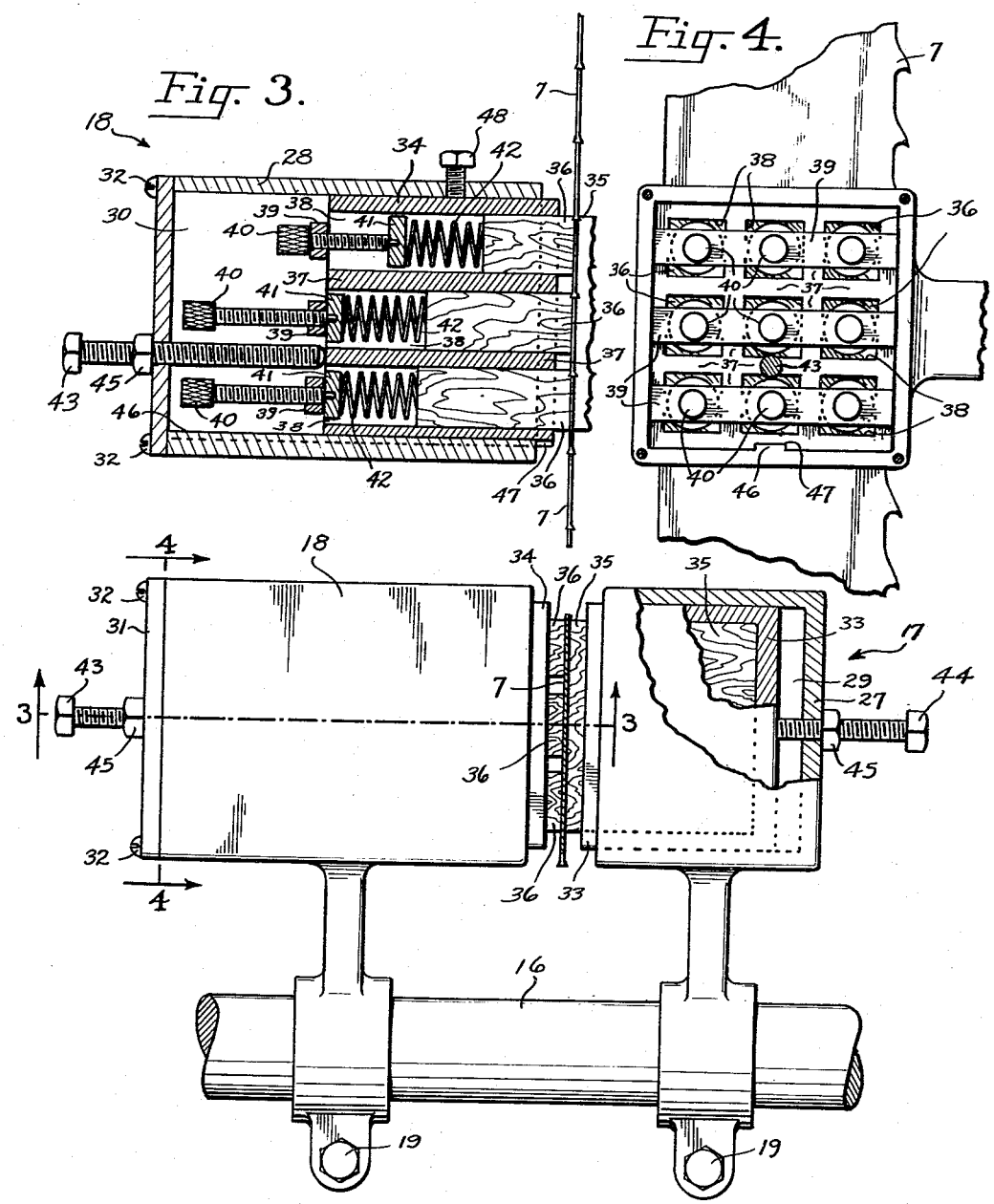

2,684,697

UNITED STATES PATENT OFFICE 2,684,697

BAND SAW GUIDE

Ernest R. Ferrari, Vancouver, Wash.

Application November 16, 1951, Serial No. 256,714

11 Claims. (Cl. 143—166)

This invention relates to a bandsaw guide of the type which may be used either alone or in combination with a second bandsaw guide to improve the work done and to increase the life of the saw blade. Additionally, the guide holds the blade to a true path.

This invention has originated in the Pacific Northwest and is of prime utility when used with woodworking bandsaws and resaws of the type common to this major lumber producing region. To this end, the typical bandsaw guide may be described as an accessory which is fitted to a bandsaw machine closely adjacent the opposite faces of the continuous blade to prevent "snaking," whipping or lateral deviation as the blade approaches and enters the work or cut. Conventionally, such a guide consists of two halves, the first or inner half being carried inside the loop of the saw blade and the second or outer half being carried outside the loop. In theory if not in practice, a blade with the correct tension and strain should run true without the use of a guide. For this and other reasons, saw manufacturers often suggest that the two halves of the guide be placed in close proximity to but out of actual contact with the opposite faces of the blade. For example, a resaw blade may be equipped with an upper and a lower guide, the upper guide being positioned above the feed bed of the machine and the lower guide being positioned directly below the feed bed. Both guides, however, often are positioned .002 or .003 inches from the blade faces in order not to clamp the blade or restrain the movement thereof. Thus, the general function of a guide heretofore has been to keep the blade cutting in a straight line without actually clamping the blade. Contrary to these manufacturer's instructions, however, many sawyers have felt they should tighten the lower guide so the guide wear blocks actually are in rubbing contact with the faces of the blade. In so doing, these sawyers theorize that the blade will cut in a straight line and will not waver or move laterally in the cut if it is held and restrained at a point immediately adjacent the cut. In accord with this theory, then, it is the lower and more accessible guide which conventionally has been tightened by the sawyer.

Contrary to this popularly accepted theory, experience and study has shown that the above described practice of tightening the lower guide is undesirable for several reasons. Firstly, the upper wheel on a typical bandsaw is an idler and the lower wheel is the power wheel. Thus, by contacting and gripping the saw below the cut, a clamping restraint to the natural driven saw movement is imposed below the work feed plane and the major strain in the blade is made to develop between the lower guide and the lower wheel. Conversely, the minimum strain in the blade then is evidenced between the upper wheel and the lower guide. However, it is this latter or minimum strain area which does the actual cutting. Accordingly, the accepted or prior art practice actually tends to cause the blade to buckle in and above the work feed plane. In defense of this undesirable practice, however, it must be remembered that the conventional or prior art bandsaw guide is constructed so that adjustment of the upper guide often is difficult or impossible while adjustment of the lower guide is simple and quick. Thus, the only ready adjustment available has been an adjustment of the lower guide and many sawyers have acted accordingly.

Faced with the above disadvantages, both in the construction of an upper guide and in the use thereof, the instant novel guide has been devised. In use, this new guide may serve either as an upper or a lower guide and it is adjustable, quickly and readily, to very exact dimensions so that any desired guide, strain, or restraint may be imparted to the moving blade. Accordingly, one object of my invention is to provide a novel guide, which, in combination with a lower guide, may serve as an upper guide capable of adjustment into actual physical contact with the blade faces, whereby the maximum strain in the blade will be positioned and maintained immediately below the upper guide and over the working area of the blade instead of immediately below the lower guide and below the working area.

Further with reference to those disadvantages evident in the saw guides of the prior art, the structure and function of the guide per se have been found wanting in several particulars. For example, the conventional guide provides a continuous wear block which contacts the entire face of the blade intermediate the tooth gullet and the back of the saw. With such a continuous wear block, it is impossible to attain a uniform pressure across the entire face of the blade because this face is not a plane surface. Additionally, all bandsaw guides, by their very nature, tend to wear unevenly. Such uneven wear, when it appears in the continuous block type guide, amplifies the uneven pressure which initially was exerted upon the blade face and, thereafter any slight shifting of the block may cause irreparable damage to the blade. Thus, if the sawyer seeks to obtain a clamping action with a worn guide, adjustment is necessary and, if such adjustment is made too tight, the blade will overheat and either will lose its tension or the back of the blade will harden and promote early cracking. Accordingly, a further object of my invention is to provide a novel guide per se wherein a plurality of wear plates (rather than one continuous plate) are caused to contact the face of the blade in order to provide a more uniform tension and in order better to accommodate wear and adjustment.

Another object of my invention is to provide, in a guide for a bandsaw blade, a hollow carrier having a plurality of longitudinal partitions subdividing the hollow interior of the carrier into a plurality of equi-spaced, parallel tunnels. In each of these tunnels a small wear block is retained and an independently adjustable bias force, through independently acting compression springs, is exerted upon each wear block.

Yet another object of my invention is to provide a longitudinal track and groove means for guiding and limiting the movement of the wear block carrier in a bandsaw blade guide to provide cooperating adjustment and locking means respectively for moving the carrier and for securing it in place once it has been moved or adjusted.

The above and other desirable objects, capabilities and advantages inherent in and encompassed by the invention will become apparent from the ensuing description, taken in conjunction with the accompanying drawings wherein:

Fig. 1 is a side view of a power driven bandsaw machine, partially broken away, showing the cooperative relationship and positioning of my novel upper guide and a lower guide, the spacing of the lower guide halves and the blade being exaggerated somewhat for clarity;

Fig. 2 is a detail view, partially broken away, showing the cooperating inner and outer halves of my novel upper guide and indicating the relationship thereof to the front and back of the bandsaw blade;

Fig. 3 is a section view, taken substantially on the line 3—3 of Fig. 2, showing the tunnels with the small wear blocks slidably mounted therein and indicating the manner in which the independent compression springs bear upon and are adjustable with respect to the rear end of each wear block; and Fig. 4 is a section view, taken substantially on the line 4—4 of Fig. 2, showing the strap means which partially close and obstruct the rear end of each of the aforementioned tunnels, this figure better indicating the longitudinal track and groove means which guide the movements of the wear block carrier in the hollow casing member.

In Fig. 1, there is shown a typical woodworking bandsaw machine having an upper idler wheel 5 and a lower power wheel 6 over which are reeved a continuous blade 7. Power is supplied to the lower wheel 6 by an electric motor 8 through the conventional belt 9 and pulleys 10. The work bed 11 of the machine defines a work feed plane which is substantially horizontal and which, together with the presser and feed rolls 12, guides the work as it is sawed.

Referring now to the upper portion of Fig. 1, a horizontal frame member 13 is provided with the usual vertical arm 14 and with an adjustment means 15 with which the effective height of the arm 14 is adjusted. Also as is conventional, the vertical arm 14 carries a round bar 16 upon which pivotally are mounted and secured a first or inner and second or outer upper guides 17 and 18 respectively. Such pivotal mountings may be accomplished with the illustrated bolts 19 and it is these guides 17 and 18 which form the substance of my invention.

The lower guide for the bandsaw blade 7 also is formed in two halves. Thus, an inner carrier 20 is fixed to the bed of the machine and an outer carrier 21 is mounted upon a threaded follower nut 22 to provide lateral adjustment. Each of these carriers is provided with one of the wear blocks 23 and the follower nut 22 operatively engages a long screw 24 having an adjustment knob 25. The screw 24 is journaled in the frame of the machine at that end adjacent the adjustment knob 25 and an override compression spring 26 is looped about the screw. Thus, should a chip of wood or a dent in the saw blade act upon the wear blocks 23, the override spring 26 allows the entire screw, adjustment knob, follower nut, and outer carrier to move to the left in Fig. 1. Immediately after the obstruction has passed the wear block, of course, the spring 26 will return the carriers and blocks to their original adjusted position. At this juncture, the important point to note is that the faces of the lower guide wear blocks 23 do not actually contact the blade 7 but rather are spaced therefrom a slight distance such as .002 or .003 inch. This spacing has been exaggerated in Fig. 1 and the importance thereof will be explained hereinafter.

Referring more particularly to Figs. 2, 3, and 4, the inner or first and outer or second guides 17 and 18, respectively, include inner and outer hollow casing members 27 and 28 bounding inner and outer elongated hollow chambers 29 and 30, respectively. These casings and chambers preferably are non-circular or square in cross-section and are provided with adjoining open ends and with oppositely disposed closed ends. Thus, the closed end of the outer casing member 28 is defined by a cap plate 31 held in place by cap screws 32. In similar manner, complementary inner and outer open ended hollow carriers 33 and 34, respectively, slidably are mounted within the inner and outer hollow chambers. Each of these carriers functions to carry the illustrated wood, fibre or composition wear blocks which, in my invention, actually contact the opposite faces of the saw blade 7. Thus, the inner carrier 33 frictionally or slidably retains a large wear block 35 whereas the outer carrier 34 similarly retains a plurality of small wear blocks 36. I have found that iron wood, oak and synthetic fibres all will serve as excellent wear block material.

In particular, the outer carrier 34 has a plurality of longitudinal partitions 37 (both vertical and horizontal) which subdivide the hollow interior thereof into a plurality of equispaced, parallel tunnels 38. One of the aforementioned small wear blocks 36 slidably is retained within and is complementary to each of the tunnels 38. Thus, as shown in Fig. 4, nine tunnels and nine small wear blocks are provided. The number of blocks is not critical, however, and a different number of blocks such as six or twelve can be used so long as the face of the saw substantially is covered and a uniform pressure is affected thereupon. Thus, for example, a four inch blade may require the use of three rows and three columns of one inch square wear blocks whereas a larger or smaller blade may require either more or less blocks of greater or less dimension.

To the rear of each horizontal row of the aforementioned tunnels 38, a horizontal strap means 39 is secured partially to close and obstruct that end of the tunnel which is arranged adjacent the closed end of the casing member. These straps, at appropriate points, are tapped threadably to receive an adjustment screw 40. The front face of each adjustment screw 40, in turn, engages a retention plate 41 and a compression spring 42 is trapped between each retention plate and the rear face of each of the small wear blocks 36. Thus, as best shown in Fig. 3, each of the small blocks may be adjusted and tensioned independently of the other blocks to provide a uniform pressure across the face of the saw blade 7 even after the blocks have worn considerably.

As an overall adjustment mechanism, the outer guide 18 is provided with a master adjustment screw 43 which bears upon the rear face of the outer carrier 34 and which threadably is mounted in the cap plate 31. Similarly, the inner guide is adjusted with a second master adjustment screw 44 which bears upon the rear face of the inner carrier 33 and both adjustment screws are locked with lock nuts 45.

In order further to assure a uniform contact of the small wear blocks 36 with the face of the saw blade and to assure the accurate alignment of the carrier 34 within the outer casing member 28, I have provided a track and groove means. As shown in Figs. 3 and 4, this means takes the form of a track 46 which is formed in the lower face of the non-circular casing 28 and a complementary groove 47 formed in the lower face of the carrier 34. These two complementary elements extend longitudinally the length of the carrier and casing, respectively. Thus, they serve to guide and confine the movement of the carrier to one in a longitudinal direction only relative to the casing. In experience, I have found that this track and groove means is essential because of the forces which the moving saw blade 7 exerts upon the wear block and because of the delicacy of adjustment required if overheating of the saw blade is to be prevented. Further, in conjunction with the track and groove, I prefer to lock the carrier 34 in place by means of a lock means such as the screw 48. Thus, once the desired tension is acquired and the position of the carrier within the casing has been adjusted, the lock screw 48 may be tightened to hold the carrier in place until adjustment once more is required.

In use, I prefer to adjust the lower guide so that the wear blocks 23 are spaced approximately .002 or .003 inch away from actual contact with the faces of the saw. On the other hand, I prefer to adjust the upper guides 17 and 18 so that actual rubbing contact takes place between the wear blocks 35 and 36 and the faces of the saw. This upper guide contact exerts a slight restraint or grip upon the saw and generates a maximum strain in the saw blade intermediate the upper guide and the lower power wheel 6. This maximum strain improves the work of the saw and prolongs the life thereof since the actual sawing or working area of the blade always is under the most strain. In other words, so long as the grip and restraint forces exerted by the upper guide are the major or the only grip and restraint forces action upon the blade, exclusive of those forces resulting from the feed of the work into the blade, movement out of a true path, "snaking," and whipping of the blade are reduced to a minimum. Thus, the function of my guide is to hold and to stiffen the bandsaw blade above the floor of the cut so the blade will follow a true path through the board or work and "snaking" will be aleviated or eliminated entirely. This feature, then, having the upper guide exert the major or only actual physical grip, is an important part of by invention.

To take a concrete example, a band resaw machine having 54 inch wheels (5 and 6) and a 27 foot saw blade (7) will have about 6 feet of exposed blade between the point where the blade leaves the upper wheel and the point where it passes between the lower guides (23). When such a saw actually is operating, heat and other factors will cause the blade to stretch or to elongate as much as one-quarter inch. This one-quarter inch elongation produces a slack which conventionally is taken up by a spring or over center weight "take up" mechanism connected to the upper idler wheel (5). However, as is common knowledge in the sawing art, no "take up" mechanisms can respond or act quickly enough to take up the slack when the blade alternately is sawing and running free under normal operating conditions. Thus, each time a board contacts the saw blade, the weights or springs tighten up or take up the slack. Between boards, on the other hand, the weights or springs loosen up or back off to allow the blade to run free. The delay in response, that is, the time interval which elapses between the instant a board contacts or hits the blade and the instant the "take up" mechanism corrects the slack, is appreciable and is measurable with all resaws. It is during this appreciable interval of time that the blade is slack and loose within the kerf being formed. Thus, the momentary interval of slack allows the blade to run from a true path and a "snaking" action begins, which action will not damp out for at least one harmonic cycle. Accordingly, an inaccurate cut will result and the board often is warped adjacent that area where the kerf was being formed when the momentary slack developed.

With the upper guides of my invention, however, the blade actually is restrained above the cut at all times so the variation in tension and the existence of slack is of no effect. That is, the time delay of the "take up" mechanism is of no consequence because the restraint exerted by my upper guide is constant and the blade, while it can snake above the upper guide, cannot snake in the work. Thus, while I make no claim that I can eliminate snaking, I do know I can localize and restrict it to an area of the blade where it will not cause warping of the board. This restriction and control mean that the portion of the saw blade which does the actual cutting always will run true and it is an important part of my invention.

In use of the upper guide per se, adjustment of the two master adjustment screws 43 and 44 usually will suffice. In fact, even a master adjustment will not be required very often. For example, a resaw blade which is working in wet green fir must be shut down and a new or resharpened blade traded for the dull blade once every two or three hours. This change, of course, requires that the bolts 19 be loosened and the guides 17 and 18 be backed off somewhat. Because the grip on the resharpened blade must equal that on the dull blade, however, no adjustment of the master screws 43 and 44 will be required if the sawyer will mark a pair of reference lines on the round bar 16 and will move the guides back to these lines after the sharpened blade is mounted. With many prior guides, this was impractical and I have found, from actual experience, that my new guides will save 30 to 40 minutes a day in adjustment time when the resaw is working in green fir. On the other hand, because those small wear blocks 36 which are closest to the gullet of the teeth will wear first, individual adjustment of the blocks within the tunnel sometimes will be required. At such times, the cap screws 32 and the cap plate 31 are removed to allow access to the hollow chamber 30. As shown, such access is promoted by the arrangement of this cap on the outside of the saw loop. Within the chamber, each of the individual adjustment screws 40 may be turned to regulate the tension on the individual small wear blocks 36. Further, the differential wear between the individual blocks 36 often will make necessary the replacement of one or more blocks and some blocks will require such replacement more often than others. This may be accomplished quickly and efficiently with my guide by swinging the entire outer guide 18 to one side, backing off the appropriate adjustment screw 40, and replacing the block in question.

In conclusion, it will be seen that I have provided a novel upper guide which can be adjusted accurately and within very fine tolerances to produce a uniform or preselected varying pressure upon a saw blade all the way from the teeth to the back thereof. Further, by using my novel guide as an upper guide and by using a lower guide which either contacts the saw blade with less force than the upper guide or does not contact the saw blade at all, I produce a major strain in the blade at the point where the sawing work is done. This leads to more production and to an increased saw life. Further, it assures a true running saw blade, at the cutting area, in contrast to previous blades and guides.

I claim:

1. In a bandsaw machine having a bandsaw blade and a work bed, an upper saw guide having adjustable bandsaw blade engaging surfaces mounted on said machine above said work bed and a lower saw guide mounted on said machine below said work bed, both of said saw guides being mounted in close, bounding relationship with the sides of the opposite faces of said blade to inhibit lateral deviation or wavering of the blade as the latter passes between the guides, and yieldable bias means for urging said upper guide into actual physical contact with said blade, said bias means and upper guide normally exerting a greater restraining force upon the movement of the blade than does said lower guide, said upper guide means including two face plates, one defining a fixed plane area of contact with one side of said bandsaw blade, and the other face plate defining laterally movable areas of contact towards and from the fixed face plate under said yieldable bias means, each face having wear blocks, the exposed surfaces of which define said areas of contact, respectively.

2. In combination, a bandsaw having a continuous two faced blade carried by an upper idler wheel and a lower power wheel, a work bed defining a substantially horizontal work plane which is intermediate said wheels and which is intercepted by said blade at a work feed point, a guide clamp means arranged in actual physical contact with both faces of said blade above said work feed point to exert a compressive restraining force upon the blade, said guide clamp means including one large wear block and a plurality of small, individually adjustable biased wear blocks arranged opposite to each other and in contact with the two respective faces of said blade, said compressive restraining force being larger than the sum of all other similar forces exerted upon said blade by any other guide or guides whereby the maximum strain in said continuous blade is positioned and maintained below said guide clamp means while the saw is functioning.

3. A two part guide for a bandsaw blade, comprising first and second hollow casing members bounding first and second elongated hollow chambers, respectively, first and second hollow carriers complementarily and longitudinally slidable within said first and second hollow chambers, respectively, a large wear block mounted within said first carrier, and a plurality of individually adjustable equi-spaced small wear blocks mounted within said second carrier.

4. A guide for a bandsaw blade, comprising inner and outer open ended hollow casing members bounding inner and outer elongated hollow chambers arranged with the respective open ends facing one another, inner and outer open ended hollow carriers complementary to and slidably mounted within said inner and outer hollow chambers toward and from the open ends thereof, respectively, means for adjusting each of said carriers longitudinally within the elongated hollow chamber complementary thereto, a large wear block mounted in said inner carrier and protruding through and beyond the open ends of the carrier and the casing member corresponding thereto, and a plurality of equi-spaced small wear blocks slidably mounted and retained within said outer carrier and protruding through and beyond the open ends of the carrier and casing member corresponding thereto.

5. A guide for a bandsaw blade, comprising first and second open ended hollow casing members bounding first and second elongated hollow chambers arranged with the respective open ends facing one another, first and second open ended hollow carriers complementary to and slidably mounted within said first and second hollow chambers toward and from the open ends thereof, respectively, means for adjusting each of said carriers longitudinally within the elongated hollow chamber complementary thereto, a large wear block operatively mounted within said first carrier, a plurality of equi-spaced small wear blocks operatively mounted within said second carrier and protruding through and beyond the open ends of the carrier and casing member corresponding thereto, longitudinal track and groove means carried by said second casing and carrier to guide and confine the movement of the latter to a longitudinal direction only relative to the former, and locking means for securing said second carrier against inadvertent movement within said second casing.

6. A two part guide for the opposite sides of the blade of a bandsaw, comprising first and second hollow casing members bounding first and second elongated hollow chambers, respectively, first and second open ended hollow carriers complementarily slidable in a longitudinal direction within said first and second chambers toward and from the open ends thereof, respectively, a large wear block mounted within said first carrier and protruding beyond the open end thereof, a plurality of parallel small wear blocks mounted within said second carrier and protruding beyond the open end thereof, and an independently adjustable bias means bearing on one end of each said small wear block to bias the same toward the open end of said second hollow carrier.

7. In a guide for a bandsaw blade, an elongated hollow casing member bounding a hollow chamber and having one end thereof open to provide communication with said chamber, an elongated open ended hollow carrier slidably mounted within said hollow chamber toward and from the open end thereof, a plurality of elongated small wear blocks slidably mounted in parallel arrangement and spaced one from another within said carrier but protruding longitudinally beyond the open end of said casing member, and an independent and adjustable spring means bearing upon each said wear block to bias the same in a direction out through said casing open end.

8. In a guide for a bandsaw blade, an elongated hollow casing member of non-circular cross-section having one open end and one closed end, said casing member bounding a hollow chamber of non-circular cross-section extending longitudinally between said open and closed ends, an elongated open ended hollow carrier of complementary non-circular cross-section slidably mounted within said hollow chamber between its ends, said hollow carrier having a plurality of longitudinal partitions subdividing the hollow interior thereof into a plurality of equi-spaced, parallel tunnels, a wear block slidably mounted within and complementary to each said tunnel, each block having a rear and a front end, the latter of which protrudes from that end of the corresponding tunnel which is unobstructed and which also protrudes through the open end of said casing member, and an independent compression spring bearing upon the rear end of each of said wear block.

9. In a bandsaw guide, an elongated hollow chamber having one end thereof open to provide communication with said chamber, an elongated open ended hollow carrier slidably mounted for longitudinal movement within and complementary to said hollow chamber, a plurality of elongated small wear blocks slidably mounted in parallel arrangement and spaced one from another within said carrier but protruding longitudinally beyond the open end of said hollow chamber, an independent and adjustable spring means bearing upon each said wear block to bias the same in a direction out through said casing open end, and longitudinal track and groove means carried by said carrier and casing to guide the movements of the former and to limit such movement to a longitudinal direction only.

10. In a guide, a casing member having one open end and one closed end, said casing member bounding a hollow chamber which extends longitudinally between said open and closed ends, an elongated carrier longitudinally slidably mounted within said hollow chamber, said carrier being hollow and having a plurality of longitudinal partitions subdividing the hollow interior thereof into a plurality of tunnels arranged in rows and columns, strap means partially closing and obstructing that end of each tunnel which is arranged adjacent the closed end of said casing member, a wear block slidably mounted within each said tunnel, each said block having a rear and a front end, the front end of each said block being mounted to protrude through both that end of the corresponding tunnel which is unobstructed and the open end of said casing member, an independent compression spring bearing upon the rear end of each said wear block, and means intermediate each said spring and the corresponding strap means for adjusting the bias force of the spring.

11. A guide for a bandsaw blade, comprising first and second open ended hollow casing members bounding first and second elongated hollow chambers, said casing members being mounted with the respective open ends thereof facing one another in alignment, first and second open ended hollow carriers complementarily longitudinally slidable within said first and second hollow chambers, respectively, means for adjusting each said carrier longitudinally within the chamber complementary thereto, a large wear block carried by and protruding beyond said first carrier in a direction toward said second casing, a plurality of longitudinally disposed partitions subdividing the hollow interior of said second carrier into a plurality of rows and columns of parallel tunnels, a small wear block carried slidably within each said tunnel and protruding therefrom in a direction toward said first casing, an independently adjustable means biasing each said small wear block in said latter direction, and cooperating track and groove means for guiding the direction of adjustment of said second carrier within said second casing.

References Cited in the file of this patent

UNITED STATES PATENTS

| Number | Name | Date |
|---|---|---|
| 8,056 | Hedge | Apr. 22, 1851 |
| 113,926 | Pryibil | Apr. 18, 1871 |
| 150,723 | Smith | May 12, 1874 |
| 328,094 | Walker | Oct. 13, 1885 |
| 360,878 | Harris | Apr. 12, 1887 |
| 447,953 | Kendall | Mar. 10, 1891 |
| 499,162 | Emerson | June 6, 1893 |
| 567,319 | Mershon | Sept. 8, 1896 |
| 935,395 | Napier | Sept. 28, 1909 |
| 1,452,179 | Brenner | Apr. 17, 1923 |
| 1,642,838 | Causey | Sept. 20, 1927 |
| 1,704,581 | Smith | Mar. 5, 1929 |
| 1,725,089 | Lemmer | Aug. 20, 1929 |
| 1,879,145 | Erickson | Sept. 27, 1932 |

FOREIGN PATENTS

| Number | Country | Date |
|---|---|---|
| 591,394 | France | Apr. 8, 1925 |
| 799,052 | France | Mar. 23, 1936 |
| 973,388 | France | Sept. 13, 1950 |